United States Patent [19]

Bowen et al.

[11] 3,780,230

[45] Dec. 18, 1973

[54] MULTIFREQUENCY TONE RECEIVER

[75] Inventors: Edward George Bowen, Laurence Harbor; George Wilmer Dick, Colts Neck, both of N.J.

[73] Assignee: Bell Telephone Labortories, Incorporated, Murray Hill, N.J.

[22] Filed: Nov. 10, 1972

[21] Appl. No.: 305,277

[52] U.S. Cl. .......... 179/84 VF
[51] Int. Cl. .......... H04m 1/50
[58] Field of Search .......... 179/84 VF

[56] References Cited

UNITED STATES PATENTS 3,710,031 1/1973 Sellari .......... 179/84 VF

*Primary Examiner*—Kathleen H. Claffy
*Assistant Examiner*—Joseph A. Popek
*Attorney*—W. L. Keefauver et al.

[57] ABSTRACT

Apparatus for detecting the presence in a communication signal of each of a predetermined plurality of multifrequency tones, which might for example encode alpha-numeric symbols, without the use of sharply tuned bandpass filters. Each frequency in a multifrequency tone is selected from a different one of a plurality of frequency groups. Two or more first frequency detectors respond to and identify valid frequencies within each frequency group. One or more second frequency detectors monitor undesired signal energy between frequency groups which can generate spurious intra-group frequencies. A symbol decoder, jointly responsive to first and second detectors, is arranged to be inhibited by any of the second detectors when significant undesired signal energy appears.

15 Claims, 3 Drawing Figures

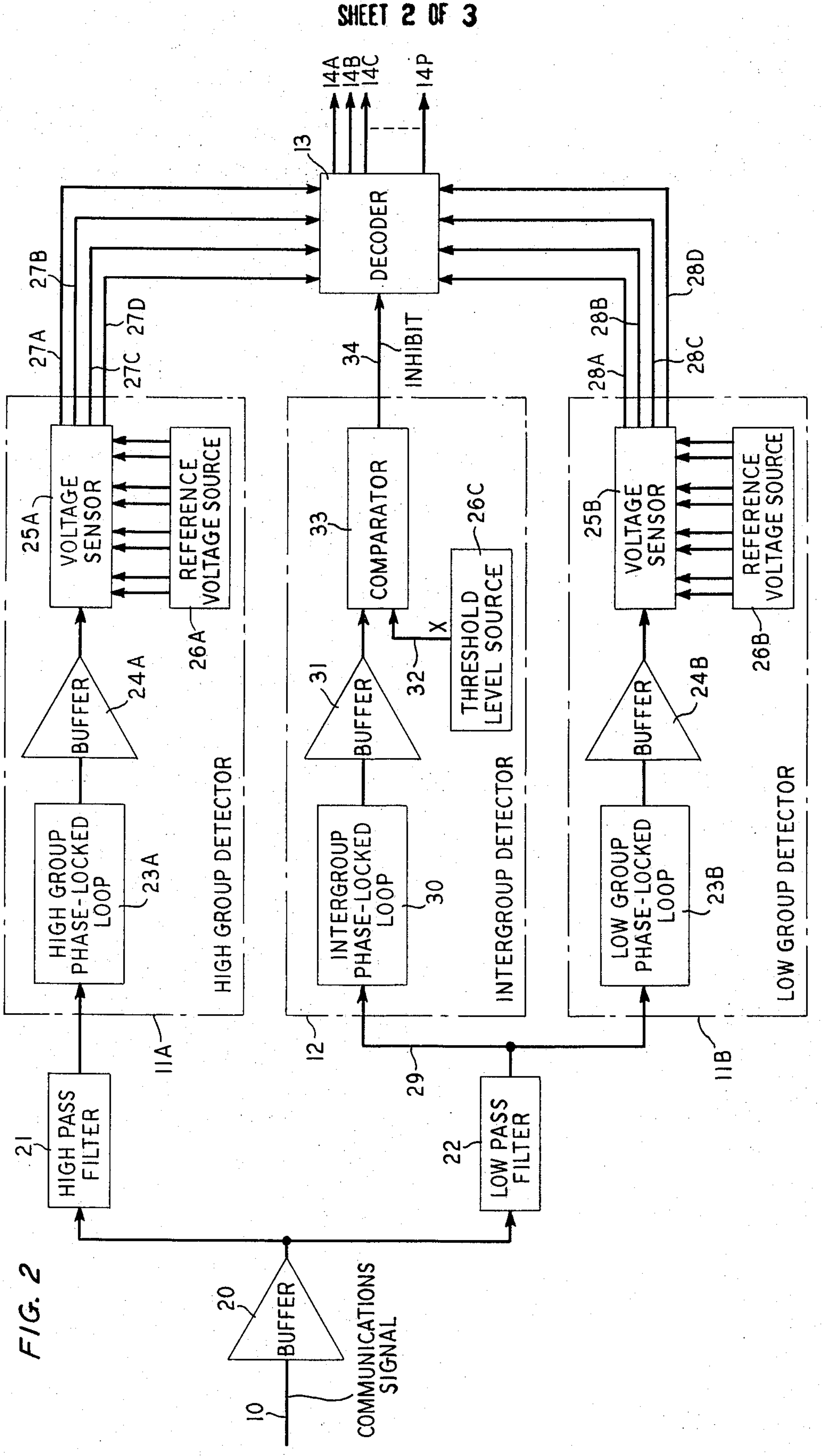
FIG. 2
COMMUNICATIONS SIGNAL
10
20
BUFFER
21
HIGH PASS FILTER
22
LOW PASS FILTER
29
11A
12
11B
HIGH GROUP PHASE-LOCKED LOOP
23A
BUFFER
24A
VOLTAGE SENSOR
25A
REFERENCE VOLTAGE SOURCE
26A
HIGH GROUP DETECTOR
INTERGROUP PHASE-LOCKED LOOP
30
BUFFER
31
32
X
COMPARATOR
33
THRESHOLD LEVEL SOURCE
26C
INTERGROUP DETECTOR
LOW GROUP PHASE-LOCKED LOOP
23B
BUFFER
24B
VOLTAGE SENSOR
25B
REFERENCE VOLTAGE SOURCE
26B
LOW GROUP DETECTOR
27A
27B
27C
27D
34
INHIBIT
28A
28B
28C
28D
DECODER
13
14A
14B
14C
14P

MULTIFREQUENCY TONE RECEIVER

CROSS-REFERENCE TO RELATED APPLICATION

A receiver for detecting and identifying each frequency of a predetermined group of single frequency tones included in a received communication signal is disclosed and claimed in our copending United States patent application, Ser. No. 288,506, filed Sept. 13, 1972. Receivers of this type are useful in the practice of our present invention.

STATEMENT OF THE INVENTION

This invention relates generally to multifrequency tone detection and more specifically to apparatus capable of detecting the simultaneous presence in a communication tone signal of each of a predetermined plurality of discrete frequency combinations.

BACKGROUND OF THE INVENTION

Multifrequency tone signaling is used throughout the telephone system for dialing and supervision. Its potential use in subscriber end-to-end signaling has been limited because conventional multifrequency tone receivers require a sharply tuned bandpass filter for each frequency. Sharply tuned bandpass filters tend to be bulky as well as expensive, particularly within the voice-frequency range. The requirement of large numbers of these in a multifrequency tone receiver tends to make the receiver too large and expensive for extensive use on a single subscriber basis.

It is therefore an object of this invention to provide a multifrequency tone receiver which does not employ sharply tuned bandpass filters.

The single frequency tone receiver described in our copending application avoids the use of sharply tuned bandpass filters for each frequency and eliminates the requirement of an individual detector for each frequency. In that receiver a frequency-to-voltage converter changes the single frequency component of each tone into a unique voltage amplitude. A voltage sensor compares this voltage amplitude with a set of reference amplitudes and produces logic outputs indicating the presence in the converter output of amplitudes within a predetermined range of any nominal reference amplitude. Each such predetermined range corresponds to a discrete frequency in the input tone signal.

The present invention combines *m* one-out-of-*n* single frequency tone receivers of the type disclosed in our copending application to implement in a particularly efficient manner an *m*-out-of-*mn* multifrequency tone receiver. The received signal of interest comprises encoded multifrequency tones, each frequency of which is selected from different frequency groups. A simple frequency-staggered combination of single frequency tone detectors with one such detector dedicated to each frequency group has proved to be unsatisfactory in a multifrequency tone system, particularly in a system employing phase-locked loops in the frequency detectors. The major drawback is the inefficient use of bandwidth occasioned by the relatively large guardbands required between frequency groups. Guardbands which are too narrow allow signal energy between frequency groups to cause simultaneous spurious responses in adjacent frequency groups.

It is a further object of this invention to protect against the spurious detection of frequencies in a multifrequency tone signal caused by excessive signal energy occurring in the gaps between closely spaced frequency groups.

A tone is here defined as a signal burst comprising one or more discrete frequency components, typically encoding an alphanumeric character. Single frequency tones are detected in our previously cited copending application. Where the tones comprise two or more frequencies, these frequencies are generated in parallel and appear simultaneously in a particular signal burst. An orderly code for such tones is composed of a fixed number of discrete frequencies selected from each of a plurality of assigned frequency groups, e.g., is composed of *m* simultaneous frequencies from a field of mn frequencies arranged in *m* groups of *n* frequencies per group.

SUMMARY OF THE INVENTION

According to this invention one or more frequency detectors is provided in addition to those dedicated to the detection of desired frequencies to monitor the presence of signal energy in the gaps between frequency groups. A receive communication signal tone including any combination of frequencies from different ones of a plurality of frequency groups is applied alike to the plurality of intragroup and intergroup detectors. Each intragroup detector is responsive only to the frequencies in a particular frequency group and produces an output signal indicative of the frequency from that group that is present in the received signal. Each intergroup detector is responsive only to the tones in the guardband or gaps between pairs of frequency groups and produces an output signal indicative of the presence in the received signal of peak signal energy in that guardband. A decoder operates on the output signals from the intragroup detectors to produce a detector output symbol represented by the particular multifrequency present in the received signal. The output signals from the intergroup detectors serve to inhibit the operation of the decoder.

It is a feature of this invention that the elimination of sharply tuned bandpass filters yields a less expensive and more compact multifrequency tone receiver.

It is another feature of this invention that the simultaneous detection of N tones requires N intragroup tone detectors and no more than N-1 intergroup tone detectors.

Another feature of this invention is that the number of frequency-dependent element required is equal to the number of frequency groups and is independent of the number of frequencies in a group.

BRIEF DESCRIPTION OF THE DRAWING

The foregoing and other objects and features of this invention will be more fully understood from the following description of the illustrative embodiment taken in conjunction with the accompanying drawing, in which

FIG. 2 is a diagram of an embodiment of the invention useful in a system where two-frequency tones are used for signaling.

DETAILED DESCRIPTION

Figure 1:
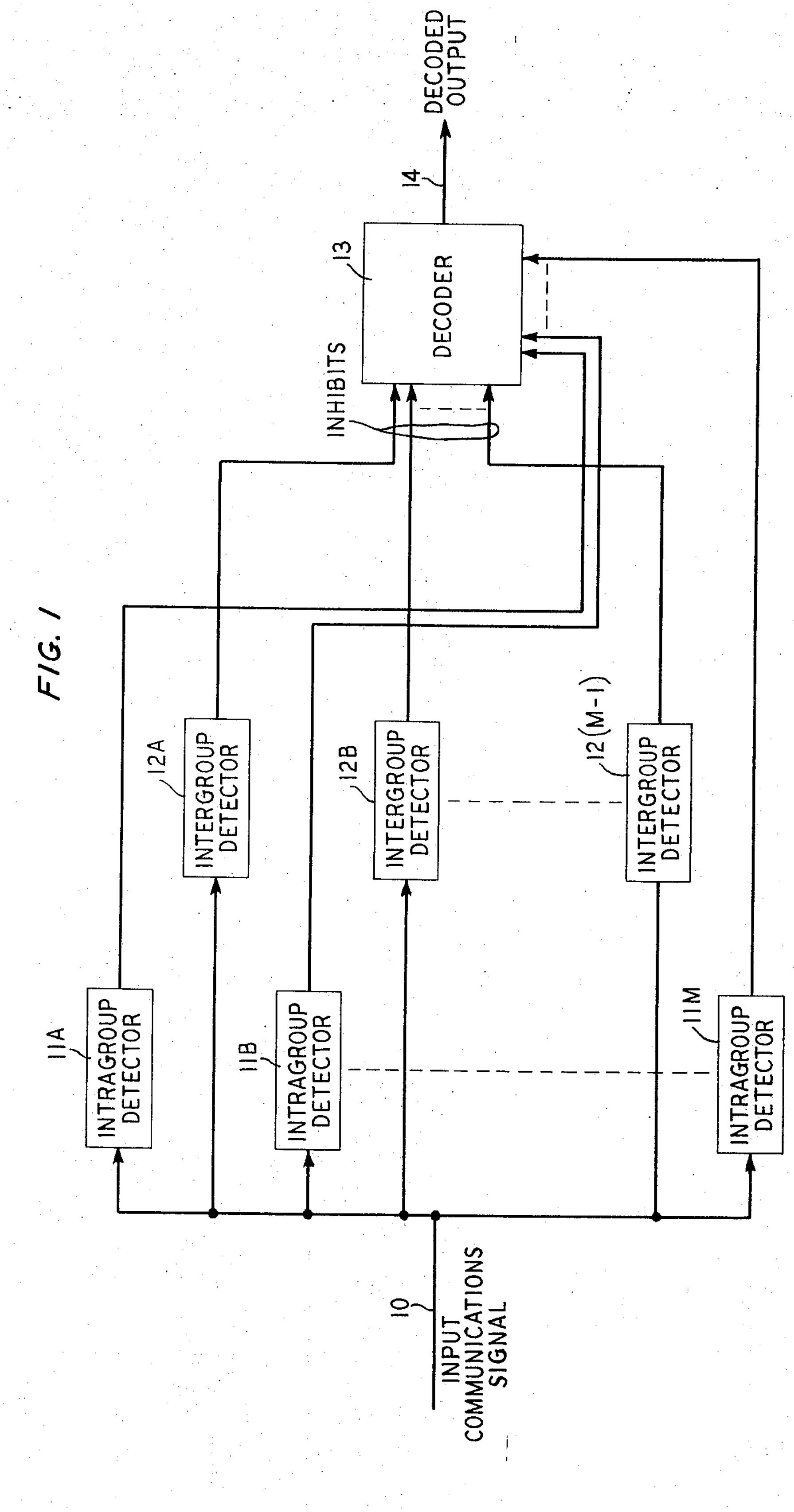
FIG. 1 is a block diagram showing the structure of a multifrequency tone detector according to this invention.

FIG. 1 is a generalized block diagram of a multifrequency tone detector employing phase-locked loops as frequency detectors. An incoming communication signal including any one of a predetermined group of multifrequency combinations is applied to intragroup frequency detectors 11 and intergroup frequency detectors 12 through lead 10. Each frequency in a tone combination is selected from a different one of a plurality of frequency groups. A guardband comprising unassigned frequencies is found between each frequency group. Each of intragroup frequency detectors 11 is responsive to the frequencies in a particular frequency group to produce output signals indicative of the particular tone present, and each of intergroup frequency detectors 12 is responsive to peak frequencies in a particular guardband to produce an output signal indicative of the presence of an undesired peak frequency in that guardband. The output signals from both intragroup and intergroup frequency detectors are applied to decoder 13. Decoder 13 operates on the outputs of intragroup detectors 11 to produce a symbol output on line 14 that the actual combination of tones present on line 10 represents. The outputs of intergroup detectors 12 inhibit the operation of the decoder when undesired peak frequencies occur. The presence of any intergroup peak frequency inhibits the operation of the decoder.

FIG. 2 is an illustrative embodiment of the invention useful in detecting two-frequency tones, such as are employed in pushbutton customer dialing systems. It is a detailed embodiment of FIG. 1 in which the elements of dashed boxes 11 and 12 correspond, respectively, to intragroup frequency detectors 11 and intergroup frequency detectors 12 of FIG. 1. Decoder 13 is common to both figures. High group frequency detector 11A and low group frequency detector 11B of FIG. 2 are each substantially identical to the single-frequency detector disclosed in our aforementioned copending application. Intergroup frequency detector 12 is similar. These frequency detectors are discussed in detail below.

A communication signal including two frequency tones whose frequency components are selected respectively from a high and low frequency group is received on line 10. The received signal is applied, respectively, to high-pass filter 21 and low-pass filter 22 through buffer amplifier 20. The signals from the filters are applied to phase-locked loops 23. Phase-locked loops 23 produce voltage signals which are applied to voltage sensors 25 through buffer amplifiers 24. Also applied to the voltage sensors 25 are reference voltage pairs, generatd by reference voltage sources 26. One reference voltage pair corresponds to each discrete frequency assigned to a frequency group. Voltage sensors 25A and 25B each produce on lines 27 and 28 a plurality of logic signals which are applied to decoder 13. In addition, the output from low-pass filter 29 is applied to phase-locked loop 30. Phase-locked loop 30 produces a voltage signal which is applied through buffer 31 to comparator 33. Also applied to comparator 33 on line 32 is reference voltage X. Comparator 33 produces an inhibit signal on line 34 which is applied to decoder 13. If there is no inhibit signal on line 34, decoder 13 produces logic signals on lines 14 indicative of the coded symbol represented by the frequency pair present in the communication signal on line 10. In the presence of an inhibit signal on line 34, decoder 13 produces no output.

Figure 3:
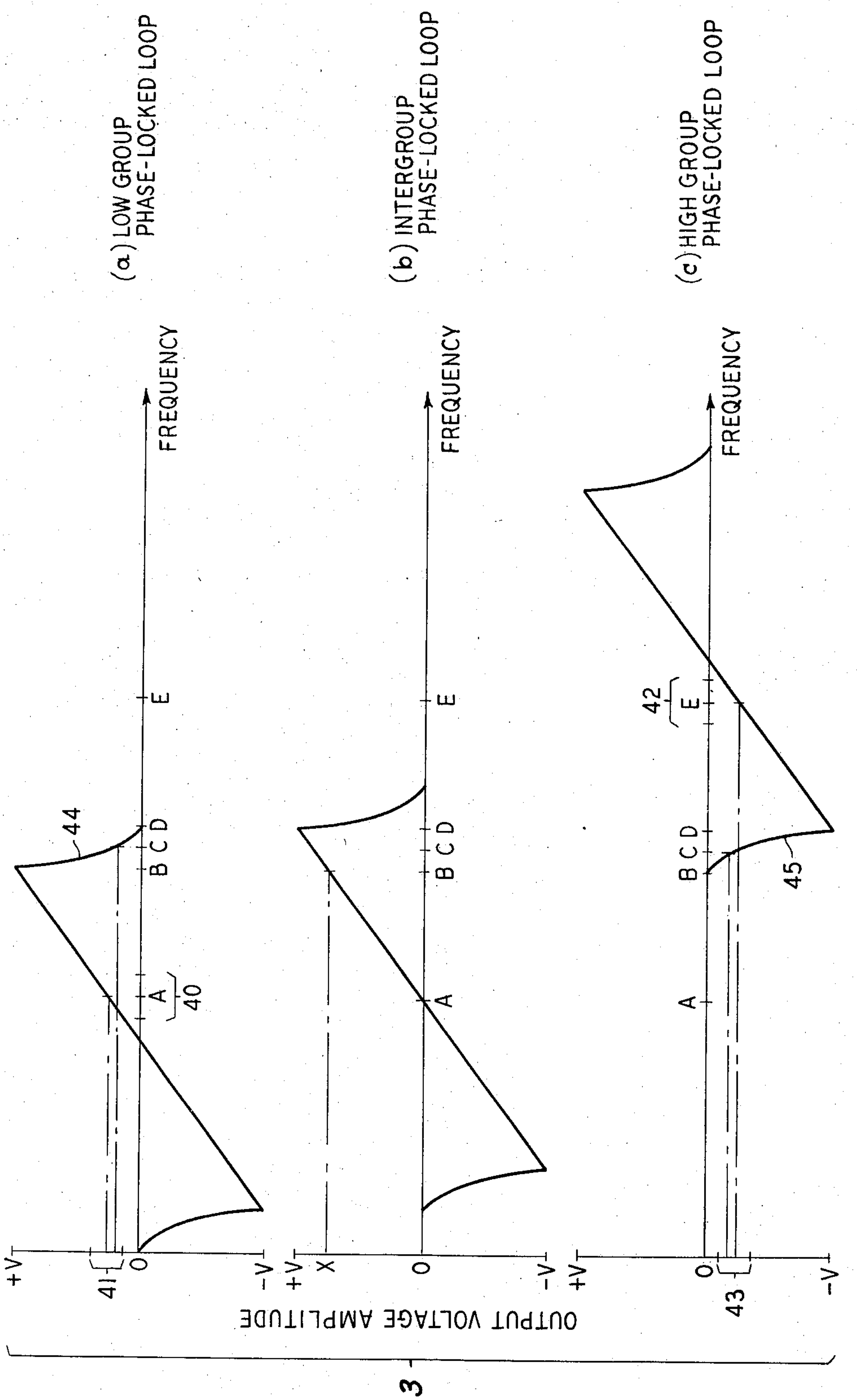
FIG. 3 illustrates the voltage-versus-frequency characteristics of the phase-locked loops employed in the embodiment of FIG. 2.

FIGS. 3(*a*), 3(*b*) and 3(*c*) illustrate the voltage-versus-frequency characteristics of the phase-locked loops employed in the embodiment of FIG. 2 and correspond, respectively, to the characteristics of the low group, the intergroup and the high group phase-locked loops. It will be observed that each phase-locked loop has a region in which its output voltage varies linearly with the frequency of the input signal. In this region it is used to advantage as a frequency-to-voltage converter. In addition, each phase-locked loop exhibits a transition region bounding each linear region. In a transition region, output voltage either rises from or drops toward zero volts as the frequency of the input signal is increased. The remaining frequencies constitute a nonresponsive region in which the phase-locked loop always produces zero volts. The inclusion of intergroup frequency detector 12 in FIG. 2 permits the overlap of the upper-frequency transition region 44 of FIG. 3(*a*) and the lower-frequency transition region of FIG. 3(*b*).

The function of intergroup frequency detector 12 of FIG. 2 is better understood through a more detailed discussion of FIG. 3. Frequency A corresponds to an assigned discrete frequency in the low frequency group, and its presence in frequency range 40 produces a low group phase-locked loop output voltage in voltage range 41 in FIG. 3(*a*). Similarly, frequency E is an assigned discrete frequency in the high frequency group and its presence in frequency range 42 produces a high group phase-locked loop output voltage in voltage range 43 in FIG. 3(*c*). Thus, the simultaneous presence of frequencies A and E produces a voltage in range 41 in FIG. 3(*a*) and a second voltage in range 43 in FIG. 3(*c*), which together define a valid symbol-encoding tone. It should be noted, however, that frequency C which is an unassigned intergroup frequency produces a pair of voltages in the same ranges 41 and 43 and can be falsely interpreted as the simultaneous presence of frequency A and B. The inclusion of intergroup frequency detector 12 alleviates this problem by detecting the presence of unassigned intergroup frequencies with significant energy levels and inhibiting tone detection in the presence of intergroup frequencies. Accordingly, threshold voltage X generated by threshold level source 26C is applied to comparator 33 over lead 32. A voltage output from phase-locked loop 30 in excess of X produces an inhibit signal on line 34. Such voltages correspond to the presence of intergroup frequencies lying between B and D in FIGS. 3(*a*), 3(*b*) and 3(*c*).

The operation of the two-frequency tone detector of this invention can be understood with reference to FIG. 2. Filters 21 and 22 in FIG. 2 provide separation between the high and low frequency groups. Phase-locked loops will not "lock" on tones outside their linear range. However, the close proximity of the high and low frequency groups results in frequencies of one group interfering with "locking" on frequencies contained in the other group. The attenuation introduced by the filters facilitates rapid locking of both phase-locked loops. Furthermore, attenuation on intergroup frequencies is so slight as to permit phase-locked loop 30 to detect intergroup frequencies at the output of filter 22 alone. In the presence of an intergroup frequency, phase-locked loop 30 produces an output voltage in excess of threshold level X, and comparator 33 indicates a TRUE output (inhibit). The incoming signals to phase-locked loops 23 produce output voltages whose amplitudes are proportional to the frequencies present on line 10. Voltage sensors 25 compare the amplitude of the voltage signals to predetermined reference voltage pairs from sources 26. Each reference voltage pair straddles a voltage corresponding to a particular assigned frequency. If the voltage signal falls between a particular reference voltage pair, a unique logic signal indicative of that frequency is produced at output lines 27 or 28 of voltage sensors 25A or 25B, respectively. In the absence of an inhibit signal on line 34, the logic signals on lines 27 and 28 are converted to unique logic signals by decoder 13. This signal, produced by decoder 13 on lines 14, is representative of the alpha-numeric symbol encoded by the two-frequency tone present in the communication signal. In the presence of an inhibit signal on line 34, decoder 13 produces no output signal.

Although a specific embodiment of this invention has been shown and described, it will be understood that various modifications may be made without departing from the spirit and scope of the principle thereof.

What is claimed is:

1. A receiver for detecting the simultaneous presence in a multifrequency tone signal of a plurality of frequencies assigned to different ones of a plurality of frequency groups comprising a plurality of intragroup frequency detectors for indicating the presence in said input signal of individual frequencies from each of said plurality of frequency groups;

at least one intergroup frequency detector for indicating the presence in said input signal of frequencies lying between said frequency groups; and decoding means jointly responsive to said intragroup and intergroup frequency detectors for producing a receiver output when only one frequency is detected in each of said frequency groups and no frequency is detected between said frequency groups.

2. The receiver of claim 1 in which each one of said intragroup frequency detectors comprises a frequency-to-voltage converter for linearly converting the frequencies from one of said plurality of frequency groups to a voltage amplitude lying in a predetermined amplitude range;

a reference source providing a plurality of voltage pairs defining each of said amplitude ranges; and a voltage sensor jointly responsive to said converted voltage amplitude and said reference voltage pairs for indicating which amplitude range bounds said converted voltage amplitude.

3. The receiver of claim 2 in which said frequency-to-voltage converter comprises a phase-locked loop.

4. The receiver of claim 1 in which each said intergroup frequency detector comprises a frequency-to-voltage converter for linearly converting intergroup frequencies in said input signal to a voltage amplitude with a predetermined range;

a threshold-level source providing at least one reference voltage corresponding to a boundary of an unassigned range of intergroup frequencies; and a voltage sensor jointly responsive to said voltage amplitude and to each reference voltage for indicating when the amplitude of said voltage amplitude falls in an amplitude range bounded by each reference voltage.

5. The receiver of claim 4 in which the second boundary of said unassigned range of frequencies comprises the limit of the linear region of said frequency-to-voltage converter.

6. The receiver of claim 4 in which said frequency-to-voltage converter comprises a phase-locked loop.

7. A receiver for detecting the simultaneous presence in a multifrequency tone signal of a plurality of frequencies assigned to different ones of a plurality of frequency groups comprising a plurality of filters for separating said tone signal into frequency groups;

a plurality of intragroup frequency detectors for frequencies lying within each frequency group;

at least one intergroup frequency detector for frequencies lying between said frequency groups; and means jointly responsive to said intragroup and intergroup frequency detectors for producing a valid receiver output only when one frequency is detected within each of said frequency groups and no frequency is detected between said frequency groups.

8. The receiver of claim 7 in which each one of said group frequency detectors comprises a frequency-to-voltage converter for linearly converting the tone frequencies from one of said plurality of frequency groups to voltage amplitudes lying in predetermined amplitude ranges;

a plurality of pairs of reference voltages defining said amplitude ranges; and a voltage sensor jointly responsive to said converted voltage amplitudes and said pairs of reference voltages for indicating whether said voltage amplitudes lie between or outside said amplitude ranges.

9. The receiver of claim 8 in which said frequency-to-voltage converter comprises a phase-locked loop.

10. The receiver of claim 7 in which each one of said intergroup frequency detectors comprises a frequency-to-voltage converter for linearly converting intergroup frequencies in said tone signal to a voltage amplitude in a predetermined range;

a threshold-level source providing at least one reference voltage corresponding to a boundary of an unassigned range of intergroup frequencies; and a voltage sensor jointly responsive to said voltage amplitudes and to each reference voltage for indicating when the amplitude of said voltage amplitude falls in an amplitude range bounded by each said reference voltage.

11. The receiver of claim 10 in which the second boundary of said unassigned range of frequencies comprises the limit of the linear region of said frequency-to-voltage converter.

12. The receiver of claim 10 in which said frequency-to-voltage converter comprises a phase-locked loop.

13. In a communications system employing multifrequency tones, including one frequency from each of a plurality of discrete frequency groups, for end-to-end signaling, a receiver for detecting and identifying each of said tones comprising a plurality of filters for separating said tones into frequency groups;

a plurality of intragroup frequency detectors for producing digital signals identifying discrete frequencies within each frequency group, each group frequency detector comprising a phase-locked loop for linearly converting the tone frequencies from one of said frequency groups to voltage amplituds lying in predetermined amplitude ranges, a plurality of pairs of reference voltages defining said amplitude ranges, and a voltage sensor jointly responsive to said converting voltage amplitudes and said pairs of reference voltages for indicating whether said voltage amplitudes lie within or outside said amplitude ranges;

at least one intergroup frequency detector for producing digital signals indicating the presence in said input signal of frequencies lying between said frequency groups, each intergroup frequency detector comprising a phase-locked loop for linearly converting intergroup frequencies in said tone signal to a voltage amplitude in a predetermined range, a threshold-level source providing at least one reference voltage corresponding to a boundary of an unassigned range of frequencies, and a voltage sensor jointly responsive to said voltage amplitudes and to each reference voltage for indicating when the amplitude of said voltage amplitude falls in an amplitude range bounded by each reference voltage; and decoding means jointly responsive to digital signals from said intragroup and intergroup frequency detectors for producing a digital output signal representative of the particular tone received when only one frequency is detected in each of said frequency groups and no frequency is detected between said frequency groups.

14. The tone receiver of claim 13 in which the second boundary of the unassigned range of frequencies in each intergroup frequency detector comprises the limit of the linear range of the corresponding phase-locked loop.

15. The tone receiver of claim 13 which detects and identifies tones including two frequencies comprising two intragroup frequency detectors and a single intergroup frequency detector.

* * * * *